United States Patent
Teramoto

(10) Patent No.: US 7,035,530 B2
(45) Date of Patent: Apr. 25, 2006

(54) RECORDING MEDIUM REPRODUCTION APPARATUS HAVING REPRODUCTION RESTRICTION INFORMATION

(75) Inventor: Kayo Teramoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 388 days.

(21) Appl. No.: 09/891,288

(22) Filed: Jun. 27, 2001

(65) Prior Publication Data

US 2002/0006094 A1  Jan. 17, 2002

(30) Foreign Application Priority Data

Jul. 11, 2000 (JP) .................. P 2000-209185

(51) Int. Cl.
*H04N 5/91* (2006.01)
*G11B 7/00* (2006.01)

(52) U.S. Cl. .................. 386/94; 386/96; 386/126; 369/53.21

(58) Field of Classification Search .......... 369/53.21, 369/84, 47.12, 47.55, 53.2, 53.22, 53.37; 386/1, 94, 96

See application file for complete search history.

(56) References Cited

U.S. PATENT DOCUMENTS

| 5,608,534 | A | * | 3/1997 | Park et al. ............... 386/83 |
| 5,691,972 | A | * | 11/1997 | Tsuga et al. ............. 369/275.3 |
| 5,813,010 | A | * | 9/1998 | Kurano et al. ........... 707/100 |
| 5,903,705 | A | * | 5/1999 | Yonemitsu et al. ....... 386/95 |
| 5,911,032 | A | * | 6/1999 | Hirayama et al. ........ 386/95 |
| 6,118,744 | A | * | 9/2000 | Sturgeon et al. ......... 369/47.23 |
| 6,320,829 | B1 | * | 11/2001 | Matsumoto et al. ...... 369/53.21 |
| 6,510,118 | B1 | * | 1/2003 | Morikawa ................ 369/84 |
| 6,618,335 | B1 | * | 9/2003 | Tanaka et al. ........... 369/53.21 |

FOREIGN PATENT DOCUMENTS

| JP | 11-110914 | 4/1999 |
| JP | 11-143642 | 5/1999 |

* cited by examiner

*Primary Examiner*—Brian E. Miller
*Assistant Examiner*—Peter Vincent Agustin
(74) *Attorney, Agent, or Firm*—Morgan, Lewis & Bockius LLP

(57) ABSTRACT

In an apparatus for reproducing a DVD 800 in which recorded data and a region code (DC) for restricting the reproduction of the recorded data is recorded, the apparatus is arranged to include a recording means in which a player region code (PC) related to the DC is recorded; an information reading means which reads the PC recorded in the recording means and also reads the DC from the DVD 800 before reproducing the recorded data from the DVD 800; a comparing means which compares the PC with the DC each read from the information reading means; a determination means which determines whether the reproduction of the recorded data is to be allowed or not based on the comparison result of the comparing means; and a control means which stops the reproduction of the recorded data and outputs and displays the DC when the determination means determines that the reproduction of the recorded data is not allowed. The recording means is the memory of the control unit 400. The information reading means is formed by the optical pickup of the reproduction unit 100 and the CPU of the control unit 400. The comparing means and the determination means are formed by the control unit 400. The control means is formed by the control unit 400 and the OSD generation unit 200.

4 Claims, 2 Drawing Sheets

RECORDING MEDIUM REPRODUCTION APPARATUS HAVING REPRODUCTION RESTRICTION INFORMATION

BACKGROUND OF THE INVENTION

1. Technical Field

The present invention relates to an apparatus for reproducing a recording medium such as a DVD etc. in which recorded data and recording medium side reproduction restriction information for restricting the reproduction of the recorded data is recorded.

2. Related Art

As disclosed in the Unexamined Japanese Patent Application Publication No. Hei 11-110914, a region management number (hereinafter merely called as "a region code") as the recording medium side reproduction restriction information is recorded in advance within the video manager information management table of TOC (table of contents) in a DVD. In correspondence with this, in a conventional DVD reproduction apparatus, a player region code as apparatus side reproduction restriction information related to the region code is recorded in advance within a system parameter storage memory.

The region code and the player region code can not be rewritten freely on a user side.

The conventional DVD reproduction apparatus is arranged in the following manner. That is, the apparatus reads the player region code from the system parameter storage memory before reproducing the recorded data from a DVD. On the other hand, the apparatus reads a region code from the DVD, then compares the player region code with the region code thus read and determines whether the reproduction of the recorded data is to be allowed or not based on the comparison result. When it is determined that the reproduction of the recorded data is not allowed, that is, when it is determined that an improper DVD which reproduction is restricted in this DVD reproduction apparatus (hereinafter merely called as "an improper DVD") is set, the reproduction of the recorded data is stopped. At the time of stopping the reproduction, the conventional DVD reproduction apparatus is arranged to display "error indication" on an image display apparatus such as a TV receiver etc. (hereinafter called as "a TV receiver" as the representative of the image display apparatuses) coupled to the DVD reproduction apparatus.

Of course, the conventional DVD reproduction apparatus starts the reproduction of a DVD when a proper DVD which reproduction is not restricted in this DVD reproduction apparatus (hereinafter merely called as "a proper DVD") is set.

[Problems to be Solved]

However, there are cases that a region number display mark for managing a reproducible region (hereinafter called as "a region No. display mark") corresponding to a region code of a DVD is described and not described on a package for the DVD. Further, there are cases that a region No. display mark is described and not described on a DVD within a package. Furthermore, there is a case that a proper DVD is not housed within a package, that is, a region code of the DVD within the package does not correspond to a region No. display mark of the package.

Thus, when reproducing a proper DVD in a conventional DVD reproduction apparatus, there arises no problem since recorded data can be reproduced as it is. However, at the time of reproducing a DVD when a user does not know that the DVD is an improper one, there arise following problems, for example.

In the conventional DVD reproduction apparatus, when an improper DVD is tried to be reproduced, although an error indication is displayed on a TV receiver as described above, the region code of the DVD is not displayed. Thus, the user can not know or understand the reason why the DVD is not reproduced merely from seeing the error indication displayed on the TV receiver.

Further, when a region No. display mark is not described on both an improper DVD and the package thereof, a user can not know what is the region code of the improper DVD.

In the case where a region No. display mark is not described on a DVD even if the region No. display mark is described on the package of the DVD, a user also cannot know what is the region code of the improper DVD when the user loses the package.

Further, even if a package is not lost, when a region No. display mark is described on the package of a DVD but not described on the DVD and a proper DVD is not housed within the package, a user also cannot know what is the region code of the improper DVD. This is because the region code of the DVD does not correspond to the player region code of a DVD reproduction apparatus used for reproduction after all even if the region No. display mark of the package corresponds to the player region code.

Further, in the case where a proper DVD is not housed within the package and a region No. display mark is described on each of a DVD and the package thereof, the region No. display mark on the DVD may be correct if the region No. display mark of the DVD does not correspond to the player region code of a DVD reproduction apparatus used for reproduction. However, in view of such a circumstance that the region No. display mark of the package does not correspond to the region No. display mark of the DVD housed within the package, it is doubtful whether the region No. display mark of the DVD is correct. In other words, a user also cannot be convinced what is the region code of the improper DVD.

In these cases, since the region code is unknown, even when an improper DVD is intended to be re-soled, such a DVD can not be re-soled suitably since a resalable region of the DVD is unknown.

Even when considering the aforesaid matters only for Japan, the following problems etc. may occur due to the present circumstances of the globalization. That is, there arises a problem when a person living in Japan travels abroad, then erroneously purchases a DVD in which a region code corresponding to Japan is not recorded and tries to reproduce the DVD in Japan by using a DVD reproduction apparatus specified for Japan. There also arises a problem when an import trader erroneously imports a DVD having a region code different from Japan and a user purchases the DVD. In this manner, there may arise more problems in the world as compared in Japan.

Accordingly, a major object of the invention is to provide a recording medium reproduction apparatus which is arranged in a manner that a user can confirm reproduction restriction information of a recording medium in which recorded data and the reproduction restriction information for restricting the reproduction of the recorded data is recorded.

SUMMARY OF THE INVENTION

[Means for Solving the Problems]

In order to solve the aforesaid problems, the recording medium reproduction apparatus according to the invention is an apparatus for reproducing a recording medium in which recorded data and recording medium side reproduction restriction information for restricting reproduction of the recorded data is recorded, and the recording medium reproduction apparatus includes:

a recording means in which apparatus side reproduction restriction information related to recording medium side reproduction restriction information is recorded;

an information reading means which reads the apparatus side reproduction restriction information recorded in the recording means and also reads the recording medium side reproduction restriction information from the recording medium before reproducing the recorded data from the recording medium;

a comparing means which compares the apparatus side reproduction restriction information with the recording medium side reproduction restriction information each read from the information reading means;

a determination means which determines whether reproduction of the recorded data is to be allowed or not based on the comparison result of the comparing means; and a control means which stops reproduction of the recorded data and outputs and displays the recording medium side reproduction restriction information when the determination means determines that the reproduction of the recorded data is not allowed.

The recording medium side reproduction restriction information is a region code.

BRIEF DESCRIPTION OF THE DRAWINGS

FIG. 1 is a schematic block diagram showing the DVD reproduction apparatus according to the embodiment of the invention.

FIG. 2 is a flow chart for explaining the characteristic operation of the DVD reproduction apparatus according to the embodiment of the invention.

DETAILED DESCRIPTION OF THE PREFERRED EMBODIMENTS

[Mode for Carrying Out the Invention]

Hereinafter, a DVD reproduction apparatus which is the recording medium reproduction apparatus according to an embodiment of the invention will be explained with reference to FIGS. 1 and 2.

Figure 1:
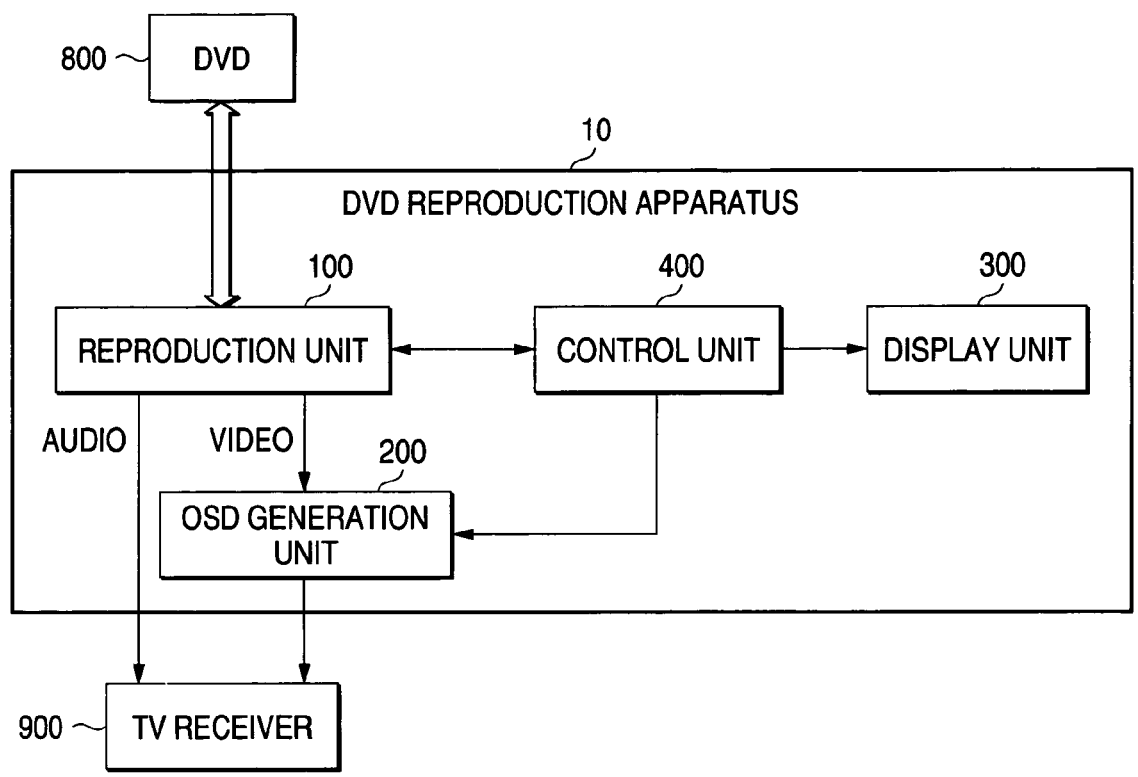
[FIG. 1]
Figure 2:
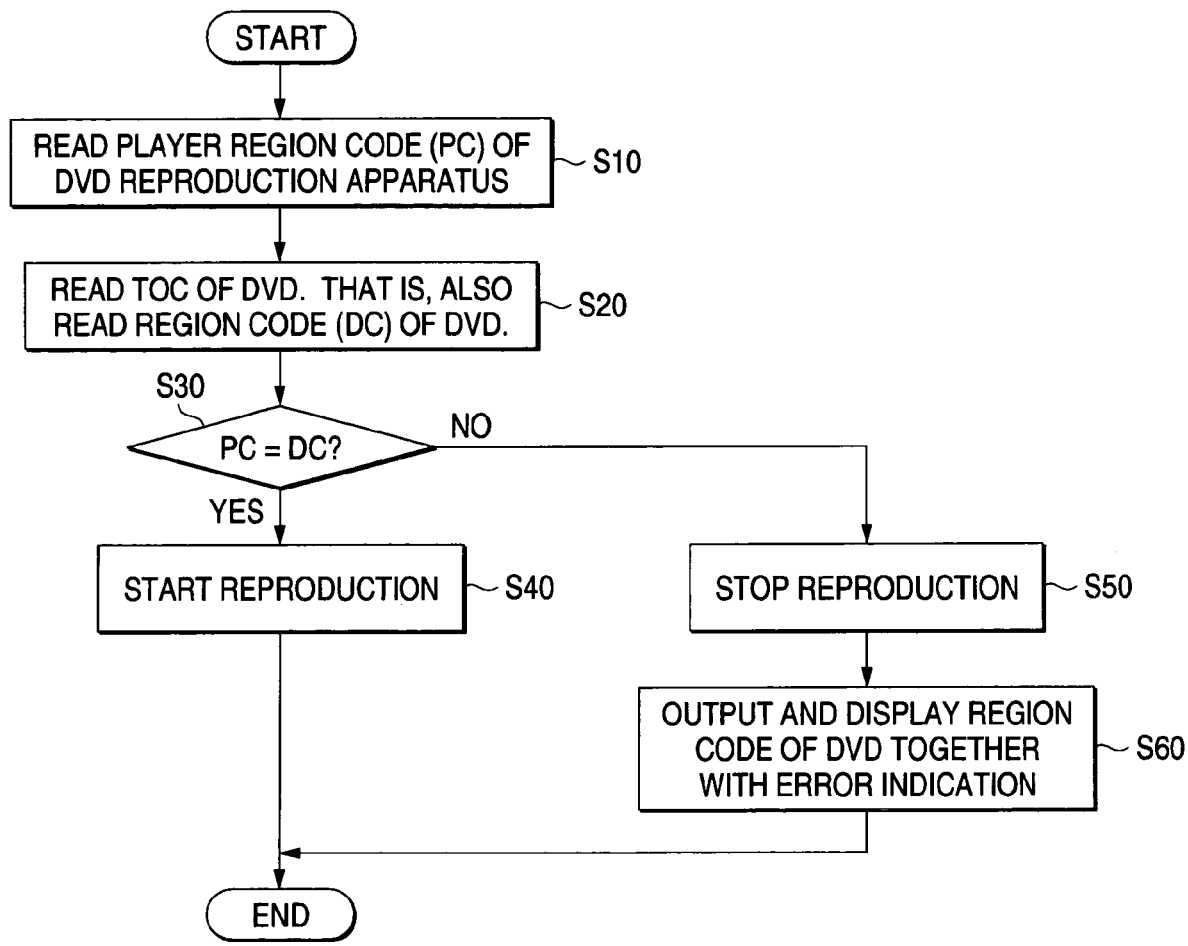
[FIG. 2]

FIG. 1 is a schematic block diagram showing the DVD reproduction apparatus according to the embodiment of the invention, and FIG. 2 is a flow chart for explaining the characteristic operation of the DVD reproduction apparatus according to the embodiment of the invention.

The DVD reproduction apparatus 10 according to the embodiment of the invention is an apparatus for reproducing a DVD 800 which is a recording medium in which recorded data and TOC data including recording medium side reproduction restriction information for restricting the reproduction of the recorded data is recorded.

The DVD reproduction apparatus 10 is characterized by including a recording means in which a player region code being apparatus side reproduction restriction information related to the recording medium side reproduction restriction information is recorded; an information reading means which reads the apparatus side reproduction restriction information recorded in the recording means and also reads the TOC data including the recording medium side reproduction restriction information from the DVD 800 before reproducing the recorded data from the DVD 800; a comparing means which compares the apparatus side reproduction restriction information with the recording medium side reproduction restriction information each read from the information reading means; a determination means which determines whether the reproduction of the recorded data is to be allowed or not based on the comparison result of the comparing means: and a control means which stops the reproduction of the recorded data and outputs and displays the recording medium side reproduction restriction information together with the error indication when the determination means determines that the reproduction of the recorded data is not allowed.

The DVD reproduction apparatus 10 including the recording means etc. is realized by the following configuration.

The DVD reproduction apparatus 10 includes a reproduction unit 100, an OSD generation unit 200, a display unit 300 and a control unit 400 for controlling these units. The reproduction unit 100 includes an optical pickup which reads the recorded data and the TOC data including the recording medium side reproduction restriction information for restricting the reproduction of the recorded data from the DVD 800. The reproduction unit 100 further includes a signal processing circuit for reproducing the recorded data (that is, reproduction of a video signal and an audio signal from the recorded data). When the reproduction unit 100 is allowed to reproduce the recorded data and starts the reproduction in accordance with the determination of the control unit 400 described later, the reproduction unit outputs the audio signal to a TV receiver 900 coupled to the outside of the DVD reproduction apparatus 10 and also outputs the video signal thereto through the OSD generation unit 200. Further, the reproduction unit 100 output the TOC data including the recording medium side reproduction restriction information thus read to the control unit 400.

The OSD generation unit 200 includes a general on-screen display function which generates a character signal instructed by the control unit 400 and superimposes the character signal on the video signal inputted from the reproduction unit 100 to thereby output to the TV receiver 900. Thus, for example, when the control unit 400 instructs the OSD generation unit 200 to display the recording medium side reproduction restriction information together with the error indication, the recording medium side reproduction restriction information is displayed on the TV receiver 900 together with the error indication.

The display unit 300 is a display part such as an LCD etc. which displays an operation state of the DVD reproduction apparatus 10, information relating to a selected image, error information, etc.

The control unit 400 is a microcomputer or an ASIC etc. having a CPU, a memory etc. The player region code, etc. are recorded in the memory in advance.

In the DVD reproduction apparatus 10 thus configured, the recording means etc. are adapted in the following manner.

The recording means is the memory of the control unit 400. The information reading means is formed by the optical pickup of the reproduction unit 100 and the CPU of the control unit 400. The comparing means and the determination means are formed by the control unit 400. The control means is formed by the control unit 400 and the OSD generation unit 200.

The recording medium side reproduction restriction information is a region code of a DVD (hereinafter abbreviated to "DC") and the player region code is hereinafter abbreviated to "PC."

The DVD reproduction apparatus 10 configured in this manner operates in the following manner (see FIG. 2).

When the DVD 800 is set to the DVD reproduction apparatus 10, the control unit 400 reads the player region code (S10). Further, the control unit 400 reads the data of TOC from the DVD 800 through the reproduction unit 100. That is, the region code is consequently read from the DVD 800 (S20).

The control unit 400 compares the player region code (PC) with the region code (DC) to determine whether the reproduction of the recorded data is to be allowed or not (S30).

When it is determined that the reproduction of the recorded data is to be allowed, that is, when it is determined that a proper DVD 800 reproduction thereof is not restricted is set in the DVD reproduction apparatus 10, the control unit 400 starts the reproduction of the recorded data (S40). On the other hand, when it is determined that the reproduction of the recorded data is not to be allowed, that is, when it is determined that an improper DVD 800 reproduction thereof is restricted is set in the DVD reproduction apparatus 10, the control unit 400 stops the reproduction without starting the reproduction of the recorded data (S50).

After stopping the reproduction of the recorded data, the control unit 400 outputs the region code of the DVD 800 together with the error indication to the TV receiver 900 coupled to the outside through the OSD generation unit 200 to thereby display them on the TV receiver. The control unit also outputs the region code together with the error indication to the display unit 300 and display them thereon (S60).

The configuration etc. of the DVD reproduction apparatus 10 is not limited to the aforesaid configuration etc. For example, the configuration of the DVD reproduction apparatus etc. may be configured in the following manner.

(1) In the aforesaid configuration, the DVD reproduction apparatus 10 is arranged to output the region code together with the error indication to each of the TV receiver 900 and the display unit 300 and display them thereon. Instead of the aforesaid configuration, the DVD reproduction apparatus may be arranged to output the region code together with the error indication to one of the TV receiver 900 and the display unit 300 and display them thereon. Further, although the region code is preferably outputted and displayed together with the error indication, only the region code maybe outputted and displayed.

The code outputted and displayed together with the error indication may not be limited to the aforesaid region code, and the code called as a parental level, for example, may be outputted and displayed together with the error indication. In this respect, the parental level is the code for preventing a DVD containing an adult image etc. from being reproduced without canceling the protection. This code of the parental level can be cancelled by a user unlike the region code.

(2) The order of the aforesaid steps S10 and S20 may be reversed. That is, the region code may be read prior to the reading of the player region code.

(3) Although the explanation was made that the DVD reproduction apparatus 10 is a type in which the image display apparatus such as a TV receiver etc. is coupled to the outside, of course, the DVD reproduction apparatus may be arranged in a type incorporating the image display apparatus therein.

(4) As described above, although the explanation was made as to the DVD reproduction apparatus as a representative of the recording medium reproduction apparatus, it goes without saying that the aforesaid configuration can be applied to the reproduction apparatus corresponding to not only the DVD but also the recording medium in which the recording medium side reproduction restriction information is set.

[Effects of the Invention]

As described above, the recording medium reproduction apparatus according to the invention is an apparatus for reproducing a recording medium in which recorded data and recording medium side reproduction restriction information for restricting the reproduction of the recorded data is recorded, and the recording medium reproduction apparatus is arranged to include the recording means in which the apparatus side reproduction restriction information related to the recording medium side reproduction restriction information is recorded; the information reading means which reads the apparatus side reproduction restriction information recorded in the recording means and also reads the recording medium side reproduction restriction information from the recording medium before reproducing the recorded data from the recording medium; the comparing means which compares the apparatus side reproduction restriction information with the recording medium side reproduction restriction information each read from the information reading means; the determination means which determines whether the reproduction of the recorded data is to be allowed or not based on the comparison result of the comparing means; and the control means which stops the reproduction of the recorded data and outputs and displays the recording medium side reproduction restriction information when the determination means determines that the reproduction of the recorded data is not allowed.

Thus, the recording medium reproduction apparatus according to the invention is arranged in a manner that when a recording medium having recording medium side reproduction restriction information not corresponding to the apparatus side reproduction restriction information of the apparatus is set, the reproduction is stopped without starting the reproduction of the recorded data, and the recording medium side reproduction restriction information representing the cause of the stoppage of the reproduction is outputted and displayed. Thus, a user can see the recording medium side reproduction restriction information thus outputted to and displayed on the TV receiver which is usually coupled to the apparatus or the display unit which is usually provided at the apparatus, for example. Therefore, it is very convenient for the user since the user can understand at a glance the reason why the error state causing the stoppage of the reproduction occurs. Of course, since the user can confirm the recording medium side reproduction restriction information of the recording medium which could not be reproduced by the apparatus, it is very convenient in such a case, for example, that there is no description relating to the recording medium side reproduction restriction information on a recording medium or the package of the recording medium.

Further, for example, when the recording medium side reproduction restriction information is the region code, it is very convenient for a user since the user can confirm the region code by using the recording medium reproduction apparatus according to the invention when the error state causing the stoppage of the reproduction occurs.

What is claimed is:

1. A recording medium reproduction apparatus for reproducing a DVD recording medium in which recorded data and table of contents data including recording medium side reproduction restriction information for restricting reproduction of the recorded data is recorded, said recording medium reproduction apparatus comprising:

recording means in which apparatus side reproduction restriction information related to recording medium side reproduction restriction information is recorded;

information reading means which reads the apparatus side reproduction restriction information recorded in said recording means and also reads the recording medium side reproduction restriction information from the recording medium before reproducing the recorded data from the recording medium;

comparing means which compares the apparatus side reproduction restriction information with the recording medium side reproduction restriction information each read from said information reading means;

determination means which determines whether reproduction of the recorded data is to be allowed or not based on the comparison result of said comparing means;

control means which stops reproduction of the recorded data and outputs and displays the recording medium side reproduction restriction information when said determination means determines that the reproduction of the recorded data is not allowed;

an OSD generating means;

a displaying means; and a reproducing means, wherein the recording medium side reproduction restriction information is a region code, wherein when said determination means determines that the reproduction of the recorded data is not allowed, said control means generates character signal related to an error signal and a recording medium side reproducing restriction information in said OSD generating means, and outputs and displays on said displaying means with superposing on a video signal; and wherein a reason why the stoppage of the reproduction occurs is displayed, when the apparatus side reproduction information and the recording medium side reproduction restriction information do not coincide with each other.

2. A recording medium reproduction apparatus for reproducing a DVD recording medium in which recorded data and table of contents data including recording medium side reproduction restriction information for restricting reproduction of the recorded data is recorded, said recording medium reproduction apparatus comprising:

recording member in which apparatus side reproduction restriction information related to recording medium side reproduction restriction information is recorded;

information reading member which reads the apparatus side reproduction restriction information recorded in said recording member and also reads the recording medium side reproduction restriction information from the recording medium before reproducing the recorded data from the recording medium;

comparing member which compares the apparatus side reproduction restriction information with the recording medium side reproduction restriction information each read from said information reading member;

determination member which determines whether reproduction of the recorded data is to be allowed or not based on the comparison result of said comparing member;

control member which stops reproduction of the recorded data and outputs and displays the recording medium side reproduction restriction information when said determination member determines that the reproduction of the recorded data is not allowed;

an OSD generating member;

a displaying member; and a reproducing member, wherein the recording medium side reproduction restriction information is a region code, wherein when said determination member determines that the reproduction of the recorded data is not allowed, said control member generates character signal related to an error signal and a recording medium side reproducing restriction information in said OSD generating member, and outputs and displays on said displaying member with superposing on a video signal; and wherein a reason why the stoppage of the reproduction occurs is displayed, when the apparatus side reproduction information and the recording medium side reproduction restriction information do not coincide with each other.

3. The recording medium reproduction apparatus according to claim 1, further comprising:

a receiving means coupled to the outside of said recording medium reproduction apparatus, wherein when said determination means determines that the reproduction of the recorded data is not allowed, said control means outputs and displays information on said receiving means and on said displaying means.

4. The recording medium reproduction apparatus according to claim 2, further comprising:

a receiving member coupled to the outside of said recording medium reproduction apparatus, wherein when said determination member determines that the reproduction of the recorded data is not allowed, said control member outputs and displays information on said receiving member and on said displaying member.

* * * * *